United States Patent
Levy

(10) Patent No.: US 6,386,011 B1
(45) Date of Patent: May 14, 2002

(54) ADJUSTABLE CUT OFF APPARATUS FOR ELONGATED ARTICLES HAVING VARYING DEGREES OF SWEEP

(75) Inventor: Rogert Levy, Bloomfield Hills, MI (US)

(73) Assignee: Tishken Products Co., Oak Park, MI (US)

( * ) Notice: Subject to any disclaimer, the term of this patent is extended or adjusted under 35 U.S.C. 154(b) by 0 days.

(21) Appl. No.: 09/764,720

(22) Filed: Jan. 18, 2001

(51) Int. Cl.⁷ .............................. B21D 28/06; B26D 5/00
(52) U.S. Cl. .............................. 72/129; 72/166; 83/308; 83/316; 83/365; 83/371; 83/743
(58) Field of Search .......................... 72/166, 132, 131, 72/129; 83/745, 316, 308, 743, 365, 371, 209

(56) References Cited

U.S. PATENT DOCUMENTS

| | | | |
|---|---|---|---|
| 871,532 A | * 11/1907 | Stanton | 83/314 |
| 2,351,868 A | * 6/1944 | Morgan | 83/317 |
| 3,129,624 A | 4/1964 | Auer | |
| 3,272,045 A | 9/1966 | Cookson | |
| 3,277,758 A | * 10/1966 | Greenberger | 83/316 |
| 3,704,643 A | 12/1972 | Cookson | 83/294 |
| 3,803,966 A | 4/1974 | Plegat | 83/294 |
| 3,805,654 A | 4/1974 | Plegat | 83/294 |
| 3,955,389 A | * 5/1976 | Foster | 72/7.4 |
| 4,407,179 A | 10/1983 | Iwase et al. | 83/865 |
| 4,530,226 A | 7/1985 | Granzow et al. | 72/171 |
| 4,627,254 A | 12/1986 | Kitsukawa et al. | 72/132 |
| 4,972,696 A | * 11/1990 | Apps et al. | 72/16.2 |
| 5,305,625 A | 4/1994 | Heinz | |
| 5,813,594 A | 9/1998 | Sturrus | |
| 5,816,127 A | 10/1998 | Ouchi et al. | 83/320 |
| 5,974,932 A | 11/1999 | Suzuki et al. | 83/745 |
| 6,050,166 A | * 4/2000 | Gauler et al. | 83/209 |

\* cited by examiner

*Primary Examiner*—Daniel C. Crane
(74) *Attorney, Agent, or Firm*—Dykema Gossett PLLC

(57) ABSTRACT

A cut off apparatus is provided to be in line with a roll-forming machine and sweep-forming apparatus, and is particularly adapted for adjustably receiving and perpendicularly cutting bumper-length segments from any elongated compound swept article. The cut off apparatus includes a frame having a base, support columns, an overhead support, and support braces. A movable carriage is mounted on the support columns for ascending and descending the support columns. A first arm is pivotally mounted on the carriage, and a second arm is pivotally mounted on the first arm. The first arm includes a stop block for engaging and carrying the second arm when the first arm pivots. A cutter housing is pivotally mounted on the second arm for receiving and cutting the elongated compound swept article. The carriage, first arm, second arm, and cutter housing are maintained in a substantially "weight free" state by a counterbalance means. During the operation of the apparatus, the cutter housing automatically adjusts over degrees of curvature in the elongated compound swept article when the arms pivot. The cutter housing freely adjusts for the varying height of the elongated compound swept article by the movable carriage. The cutting means in the cutter housing is co-linear with longitudinal axes of the first arm and the second arm so that it perpendicularly severs the elongated compound swept article during the cutting stroke.

55 Claims, 3 Drawing Sheets

ADJUSTABLE CUT OFF APPARATUS FOR ELONGATED ARTICLES HAVING VARYING DEGREES OF SWEEP

BACKGROUND OF THE INVENTION

1. Field of the Invention

This invention relates to a cut off apparatus, and in particular to an automatic self-adjustable cut off apparatus for cutting bumper-length segments from an elongated article having varying degrees of curvature, or sweep, made on a continuous roll-forming and sweeping process.

2. Description of Related Art

In the prior art, cut off apparatuses are used in-line with roll forming machines to cut lengths of roll-formed articles. Also commonly used in-line with roll forming machines are sweep-forming apparatuses which introduce a longitudinal curvature, or sweep, into the roll-formed elongated article. Standard cut off devices are not particularly well suited to sever such elongated swept articles. Traditionally, this problem was attempted to be solved by use of a track to guide the cutoff mechanism during the cutting stroke. More recently, a cut off apparatus is described in U.S. Pat. No. 5,305,625 that automatically adjusts to variations in speed and minor changes in curvature to cut bumper-length segments from an elongated swept article.

Unfortunately, the prior art does not address the long standing need for an automatic means to cut elongated articles which have varying degrees of curvature, or compound sweeps. Articles such as motor vehicle bumpers are manufactured on a roll-forming machine and are then curved along the longitudinal direction on a sweep-forming apparatus. The sweep-forming apparatus initially introduces in to the article a curve of a smaller radius, followed by a curve of a larger radius, and finally another smaller radius curve. This permits a single bumper element to match the contour of the front or rear of a motor vehicle, and overlap slightly around the sides of the vehicle.

The varying radii of such articles prevent the use of cut off devices designed for elongated articles swept with a constant curve. This problem arises because the portion of the compound swept elongated article that passes through the cut off apparatus moves relative to the cutting device, both with respect to the height of the article and with respect to the relative angle between the cutting means and the article. Currently, this problem is overcome by pausing the manufacturing process and manually severing the elongated compound swept article. Problems with this solution, however, include increasing the time necessary to manufacture bumper elements, and difficulty in ensuring that the article is perpendicularly severed at a precise length.

Accordingly, it is desirable to provide an automatic cut off apparatus that automatically adjusts for elongated articles having compound sweeps and perpendicularly severs the article at predetermined lengths.

SUMMARY OF THE INVENTION

To meet the above described desires, the present self-adjusting cut off apparatus for automatically cutting segments of a predetermined length from an elongated compound swept article is disclosed. In a preferred embodiment the present invention provides an apparatus having a frame with a fixed base, a pair of support columns fixedly mounted on the base, an overhead support fixedly mounted on the support columns, and a pair of support braces fixedly mounted on both the support columns and the base. A carriage is movably mounted on the support columns for ascending and descending the apparatus. A first arm is pivotally mounted on the carriage. A second arm is pivotally mounted on the distal end of the first arm. A cutter housing is pivotally mounted on a mounting plate which is perpendicularly fixed to the distal end of the second arm. The cutter housing includes a first passageway and a second passageway through which the elongated compound swept article enters and exits, respectively, rollers for supporting the article in the cutter housing, and an automatic cutting means. The carriage, first arm, second arm, and cutter housing are supported by a counterbalancing means which allows the carriage, first arm, second arm, and cutter housing to operably move in a substantially "weight free" state. The combined length of the first arm and the second arm equals the radius of the larger curves in the elongated compound swept article, and the length of the second arm equals the radius of the smaller curves in the article. During the operation of the apparatus, the cutter housing receives the elongated compound swept article. As the larger radius curved portions of the elongated article pass through the cutter housing, the first arm pivots in the direction of the moving article, carrying the second arm and cutter housing along with it. When the smaller radius curved portions of the elongated article pass through the cutter housing, the first arm remains still and the second arm pivots in the direction of the moving article, carrying the cutter housing along with it. Through the carriage and counterbalance, the cutter housing adjusts for the varying height of the elongated compound swept article. The cutting means is positioned within the cutter housing at a point co-linear with the longitudinal axes of the first arm and second arm such that during the cutting stroke the elongated compound swept article is perpendicularly severed.

It is a feature of the present invention to provide a cut off apparatus that automatically adjusts for changes in the degree of curvature and height in an elongated compound swept article.

It is another feature of the present invention to provide a cut off apparatus that automatically operates in line with a roll-forming machine and a sweep-forming apparatus as they continuously produce elongated compound swept articles.

It is a further feature of the present invention to provide a cut off apparatus that can perpendicularly cut predetermined lengths from an elongated compound swept article.

The above noted and other features of the present invention will become more apparent to those skilled in the art as the invention is further explained in the accompanying drawings and detailed description.

DETAILED DESCRIPTION OF THE PREFERRED EMBODIMENT

Figure 1:
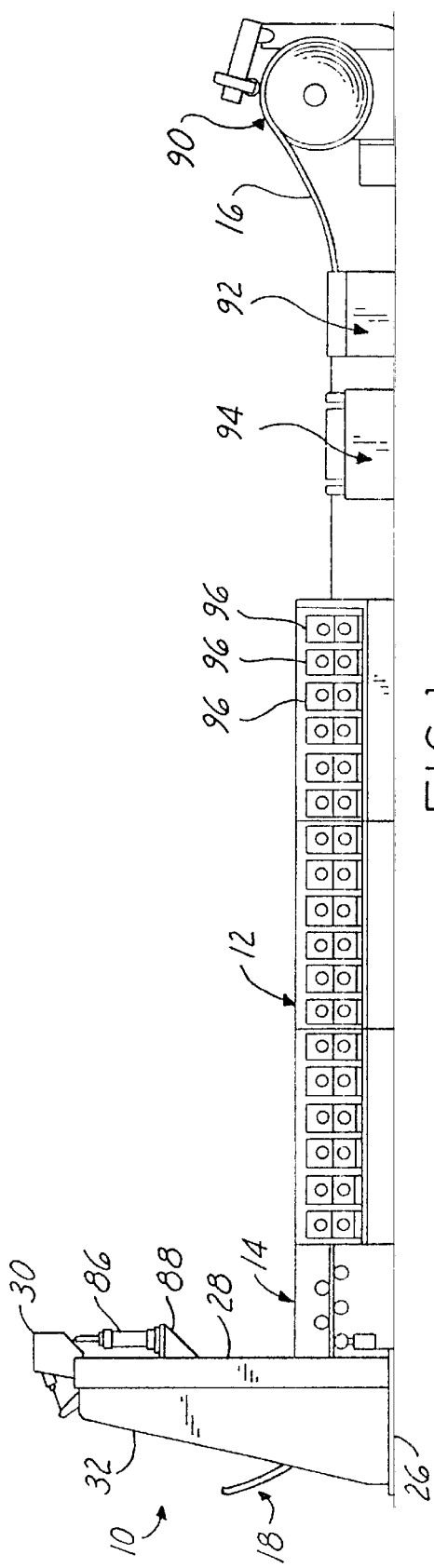
FIG. 1 is a side view of an adjustable cut off apparatus embodying the present invention in line with a roll-forming apparatus having a sweep unit.
Figure 4:
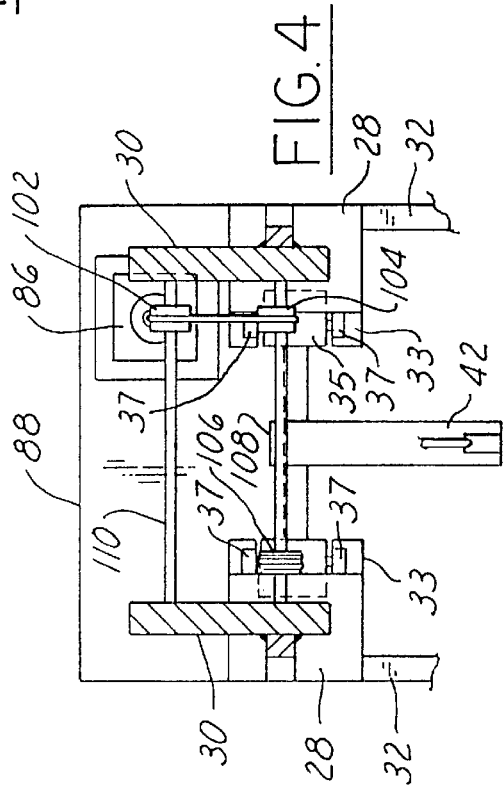
FIG. 4 is a cross-sectional view taken along the line 4—4 in FIG. 3.

Referring to FIG. 1, an adjustable cut off apparatus 10 embodying the present invention is positioned adjacent to the output end of a roll mill 12 which is provided with a sweep forming apparatus or sweep unit 14. The adjustable cut off apparatus 10 is particularly adapted for continuously and perpendicularly cutting segments of an elongated article 16 having sweeps, or curvatures, of varying radii 20, 22 in the longitudinal direction shaped by an automated roll forming process, to form, as an example, an automobile bumper.

Figure 2:
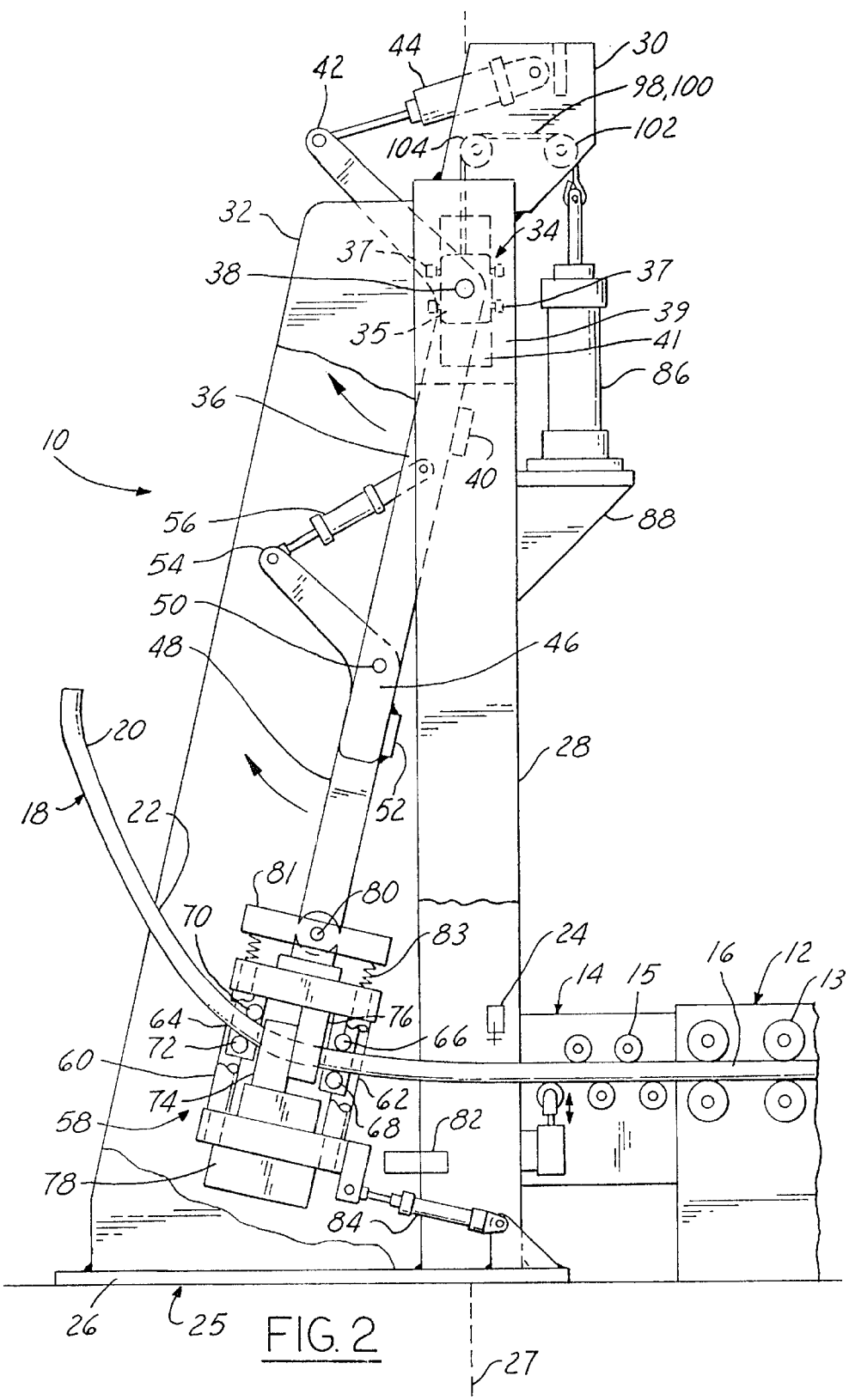
FIG. 2 is a side view of the adjustable cut off apparatus embodying the present invention.

Referring again to FIG. 1, an exemplary roll-forming line or roll mill 12 generally includes a coil holder 90 for dispensing a coiled strip of an elongated article 16, a feeding and leveling apparatus 92, and an end-welder apparatus 94 for longitudinally feeding the elongated article 16 into one or more roll-forming sections 96. As shown in FIG. 2, the roll-forming sections 96 each include a number of serially-located sets of forming rolls or rollers 13 that progressively deform the elongated article 16 as it is longitudinally fed therethrough in order to ultimately form the elongated article 16 into a configuration with a desired cross-sectional shape, as an example, a bumper.

Upon reaching the desired cross-sectional shape, the elongated article 16 is fed into a sweep-forming apparatus 14, such as the apparatus disclosed in U.S. Pat. No. 4,530,226 to Granzow et al. issued Jul. 23, 1985 entitled SWEEP-FORMING APPARATUS. The sweep-forming apparatus 14 permanently deforms the elongated article 16, thereby introducing sweep in it and shaping it into an elongated swept article 18. In addition to introducing a constant sweep into an elongated article, the sweep-forming apparatus or unit 14 can shape or form compound sweeps of varying degrees of curvature in different portions of the elongated swept article 18. The swept article 18, or bumper element, in the preferred embodiment typically includes a small radius sweep in each of its longitudinal extremities and a central portion with a large radius sweep. The sweep-forming apparatus or unit 14 perforates the elongated article with an aperture at regular intervals. The sweep-forming unit 14 also has an electronic optical sensor 24. When the electronic optical sensor 24 registers an aperture, it sends an appropriate signal to the cutting means, as described below.

Figure 3:
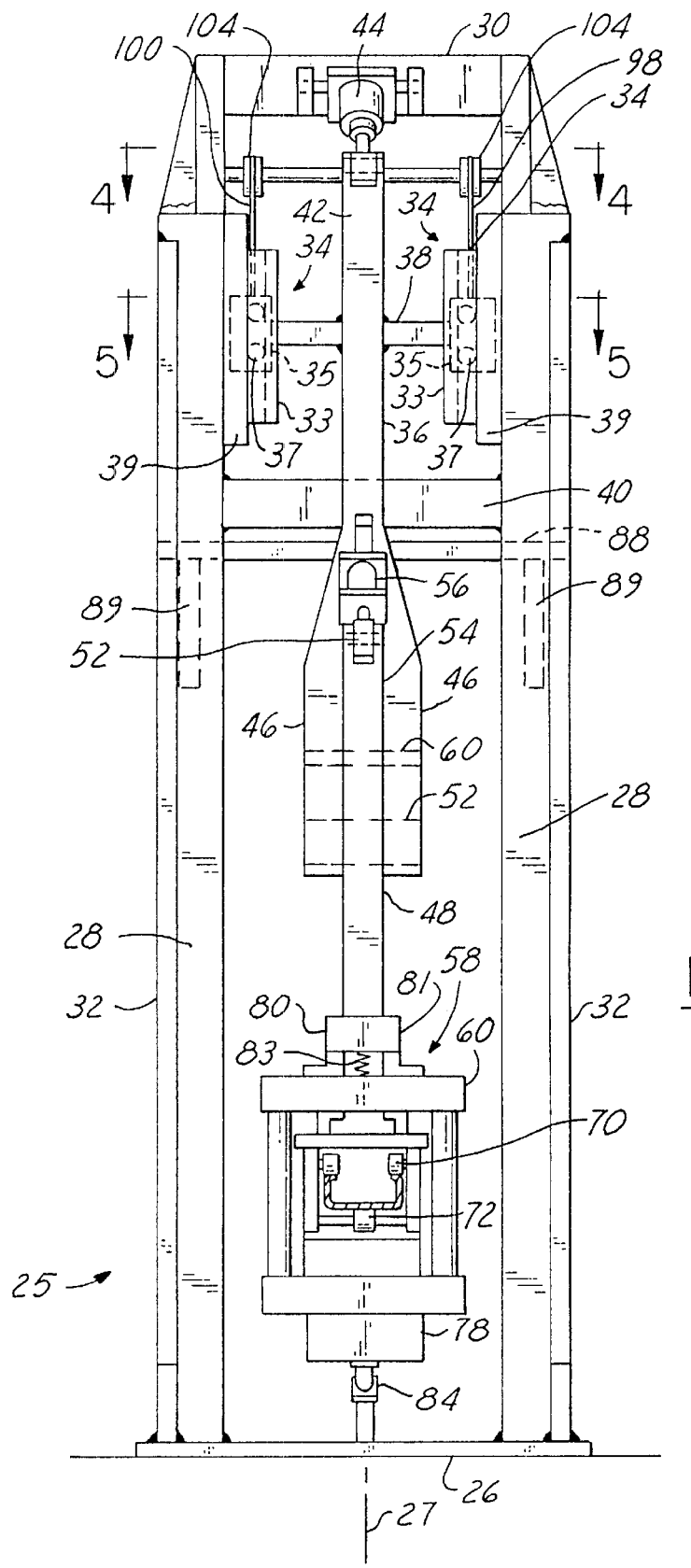
FIG. 3 is an end view of the adjustable cut off apparatus of FIG. 2.

The adjustable cut off apparatus 10 illustrated in FIGS. 2 and 3 includes a frame 25 having a fixed base 26, a pair of support columns 28 fixedly mounted on the base 26, an overhead support 30 fixedly mounted on the support columns 28 and a pair of braces 32 fixedly mounted both to the overhead support 30 and the base 26. The frame 25 has a longitudinal central axis 27 as shown in FIGS. 2 and 3.

Figure 5:
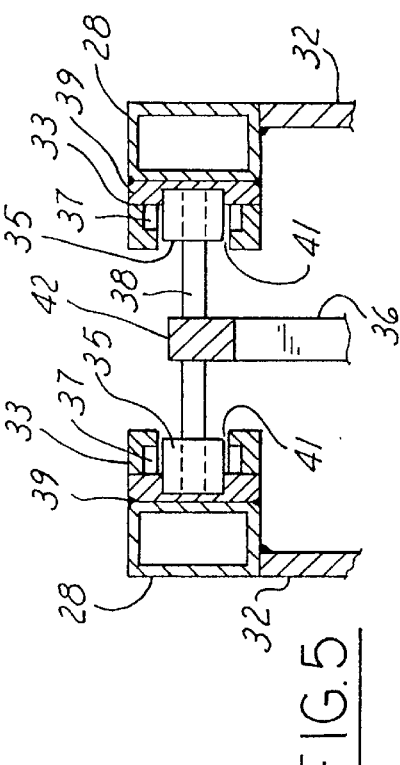
FIG. 5 is a cross-sectional view taken along the line 5—5 in FIG. 3.

A carriage 34, as shown in FIGS. 2, 3, and 5, is mounted on the support columns 28 for ascending and descending the apparatus 10. The carriage 34 comprises a set of carriage bodies 35, each carriage body 35 disposed about an end of a first pivot pin 38. Mounted on each carriage body 35 is a set of four carriage rollers 37. Mounted on the interior surfaces of the support columns 28 are a set of carriage channel blocks 39, which define a channel 41 in which the carriage bodies 35 can travel parallel to the longitudinal axis 27 of the frame 25. A track 33 for receiving the carriage rollers 37 is mounted on the carriage channel block 39. The track 33 provides a surface on which the rollers 37 roll and carry the carriage bodies 35.

A first arm 36 is pivotally mounted between the carriage bodies 35 on the first pivot pin 38. The first arm 36 has an upper end 42 to provide leverage and which is fixed at an angle relative to the distal end of the first arm 36. A first return means 44 is fixedly attached to the upper end 42 of the first arm 36 and to the overhead support 30 as shown in FIG. 2. The first return means 44 returns the first arm 36 to an initial position after the first arm 36 pivots about first pivot pin 38. In the preferred embodiment, the first return means 44 is an air cylinder having a piston and moveable rod therein. A first stop means 40 is fixedly mounted between the support columns 28, to provide an initial position from which the first arm 36 can pivot, and to which the first return means or air cylinder 44 returns the first arm 36 after pivoting. The first arm 36 additionally has a lower forked end 46 as illustrated in FIG. 2.

A second arm 48, which has a smaller length than the first arm 36, is pivotally attached to a second pivot pin 50, mounted between the tines of the forked end 46 of the first arm 36. The second arm 48 has an upper end 54 to provide leverage which is fixed at an angle relative to the distal end of the second arm 48. A second return means 56 is fixedly attached to the upper end 54 of the second arm 48 and to the first arm 36 for returning the second arm 48 to an initial position after the second arm 48 pivots about second pivot pin 50. In the preferred embodiment, the second return means 56 is an air cylinder having a piston and rod moveable therein. A second stop means 52 is also fixedly mounted between the tines of the forked end 46 of first arm 36, providing an initial position from which the second arm 48 can pivot, and to which the second air cylinder 56 returns the second arm 48 after pivoting. Additionally, when the first arm 36 pivots, the second stop means 52 engages the second arm 48 so that the first arm 36 carries the second arm 48 when the first arm 36 pivots.

A mounting plate 81 is mounted on the second arm 48 distal to the second pivot pin 50. The mounting plate 81 is fixed perpendicular to the second arm 48. A cutter housing 60 is pivotally mounted on the mounting plate 81 by a third pivot pin 80. Retaining springs 83 are mounted between the mounting plate 81 and cutter housing 60, and maintain cutter housing 60 parallel to the mounting plate 81. The cutter housing 60 includes a first passageway 62 and a second passageway 64 in alignment with each other. Within the cutter housing 60 is located a pair of upper leading rollers 66, a lower leading roller 68, a pair of upper trailing rollers 70, and a lower trailing roller 72. The upper leading rollers 66 and upper trailing rollers 70 engage the upper outer surface of the elongated swept article 18, and the lower leading roller 68 and lower trailing roller 72 engage the lower outer surface of the elongated swept article 18. Located between the leading and trailing sets of rollers is a means for cutting 58. In the preferred embodiment, the means for cutting 58 is an offset die block system. A stationary die block 76 having an opening to receive the elongated swept article 18 is fixedly mounted on the cutter housing 60. A movable die block 74 also having an opening to receive the elongated swept article 18 is located immediately adjacent to the stationary die block 76. The movable die block 74 is mounted on a hydraulic press or cylinder 78. The hydraulic press 78 is fixedly attached to the cutter housing 60. A third return means 84 is fixedly attached to the cutter housing 60 and to the base 26 for returning the cutter housing 60 to an initial position after the cutter housing 60 pivots about the third pivot pin 80 and after the cutter housing 60 is carried by the second arm 48. In the preferred embodiment, the third return means 84 is an air cylinder having a piston and rod moveable therein. A third stop means 82 is fixedly mounted between the support columns 28, providing an initial position from which the cutter housing 60 can pivot and travel with the second arm 48, and to which the third air cylinder 84 returns the cutter housing 60.

The cutting means 58 is located at an equal distance between the leading rollers 66, 68 and the trailing rollers 70, 72, This center point is co-linear with the third pivot pin 80 and the second pivot pin 50. During the cutting stroke, the engagement of a section of the elongated swept article 18 by the sets of leading rollers 66, 68 and trailing rollers 70, 72 defines an arc through which the cutting means 58 perpendicularly bisects the swept article 18.

The carriage 34, first large radius arm 36, second small radius arm 48, and cutter housing 60 are supported by a counterbalancing means or device 86 so as to allow the carriage 34, first arm 36, second arm 48, and cutter housing 60 to operably move in a substantially "weight free" state. Such a weight free state permits the carriage 34 to effortlessly ascend and descend the support columns 28 in order to adjust for the varying height, relative to the base 26, of the elongated swept article 18 as it passes through the cutter housing 60. The weight free state also permits the first arm 36, second arm 48 and cutter housing 60 to readily pivot so as to adjust the cutting means 58 for the degree of sweep in the elongated swept article 18 as it passes through the cutter housing 60. Additionally, the weight free state permits the cutting means 58 to operate during the cutting stroke without the weight of the carriage 34, first arm 36, second arm 48, and cutter housing 60 resting unacceptably heavily on the elongated swept article 18.

As shown in FIGS. 2 and 3, counterbalance means 86 includes a fluid cylinder with a piston and rod movable therein. Counterbalance means 86 is mounted on a counterbalance support 88 which is fixedly attached to counterbalance support braces 89, which are fixedly mounted on the support columns 28. As shown in FIGS. 2, 3, and 5, a first cable 98 is attached to the counterbalance 86, is supported by counterbalance pulley 102 and shared pulley 104, and is also attached to the carriage body 35 nearest to the shared pulley 104. Counterbalance pulley 102 is disposed about a shaft 110 mounted on the overhead support 30. Shared pulley 104 is disposed about an axle 108 mounted on the overhead support 30. A carriage winch 106 is also disposed about axle 108. A second cable 100 is attached to the carriage winch 106, and to the carriage body 35 not attached to the first cable 98. Through this assembly, the counterbalance 86 maintains the carriage 34, first arm 36, second arm 48, and cutter housing 60 in a substantially weight free state.

The operation of the adjustable cut off apparatus 10 follows. The elongated article 16 is presented to the feeding and leveling apparatus 92 from a coil 90. The elongated article 16 is then fed into the end-welder apparatus 94 for longitudinally feeding the elongated article 16 into one or more roll-forming sections 96. The elongated article 16 is shaped by forming rollers 13 until the elongated article 16 has a cross section of desirous shape. The elongated article 16 is then automatically fed into a sweep forming unit 14 where the elongated article 16 is permanently deformed in a transverse direction in order to introduce a sweep, or curvature, therein. The sweep forming unit 14 introduces different degrees of sweep in the elongated article 16 resulting in the elongated swept article 18 having a smaller degree of curvature at its longitudinal extremities 20, and a larger degree of curvature between the extremities 22. During the sweep forming process, the sweep forming unit 14 perforates a small aperture in the elongated swept article 18. The electronic optical sensor 24 registers this aperture and sends an appropriate signal to the hydraulic press in order to cut the elongated swept article 18, as more fully detailed below.

Upon exiting the sweep forming unit 14, the elongated swept article 18 enters the first passageway 62 of the cutter housing 60, where the upper leading rollers 66 engage the upper surface of the elongated swept article 18 and the lower leading rollers 68 engage the lower surface of the elongated swept article 18. The elongated swept article 18 then proceeds through both the stationary die block 76 and movable die block 74. Upon feeding through the die blocks, the upper trailing rollers 70 engage the upper surface of the elongated swept article 18, and the lower trailing roller 72 engage the lower surface of the elongated swept article 18. The elongated swept article 18 finally exits through the second passageway 64.

As the elongated swept article 18 progresses through the adjustable cut off apparatus 10, the cutter housing 60 must operably adjust for the different degrees of sweep and the fluctuating height of the elongated swept article 18 relative to the base 26 of the apparatus 10. The cutter housing 60 is adjusted for the varying height of the elongated swept article 18 by the carriage 34 which readily ascends and descends the height of the support columns 28, as the cutter housing 60, second arm 48, first arm 36, and carriage 34 are maintained in a substantially weight free state by the counterbalancing means 86. The cutter housing 60 adjusts to the different degrees of curvature of the elongated swept article 18 by the pivoting, or swinging, of the first large radius arm 36 and the second small radius arm 48. The distance along the second arm 48, through the third pivot pin 80 to the center point between the first and second passageways 62, 64 equals the radius of the smaller radius sections 20 swept into the elongated swept article 18. As the extremities of the elongated swept article 18 enter the cutter housing 60, the second arm 48 pivots about the second pivot pin 50 so as to permit the elongated swept article 18 to pass through the cutter housing 60 and to adjust the cutter housing 60 along the smaller degree of sweep 20 of the elongated swept article 18. The second arm return means or cylinder 56 and third cutter return means or cylinder 84 then returns the second arm 48 and cutter housing 60, respectively, toward their respective initial positions.

Similarly, the distance from the first pivot pin 38, through the second pivot pin 50 and the third pivot pin 80, to the center point between the first and second passageways 62, 64 equals the radius of the larger radius sections 22 swept into the elongated swept article 18. As the central area of the elongated swept article 18 enters the first passageway 62 of the cutter housing 60, the first arm 36 pivots about the first pivot pin 38. As the first arm 36 swings outward, the second stop means 52 engages the second arm 48 so that the two arms 36, 48 move uniformly. The cutter housing 60 then follows along the larger sweep 22 of the elongated swept article 18 as it passes through the cutter housing 60. The first arm return means or cylinder 44 and the third cutter returns means or cylinder 84 then return the first arm 36 and cutter housing 60, respectively, toward their respective initial positions.

Because the cutting means 58 is located at a point that bisects an arc defined by the section of the elongated swept article 18 that is engaged by the sets of leading 66, 68 and trailing 70, 72 rollers, the cutting means 58 will perpendicularly cut the elongated swept article 18, regardless of the degree of curvature through which the cut is made.

In the preferred embodiment, upon determination by the electric optical sensor 24 that an appropriate length of the elongated swept article 18 has been presented to the adjustable cut off apparatus 10, a signal will be generated. Upon actuation of the signal, the hydraulic press 78 is pressurized, causing the movable die block 74 to engage with the elongated swept article 18, and sever it perpendicularly. The hydraulic press 78 and movable die block 74 then return to a rest position and the elongated swept article 18 passes through the movable die block 74 and second passage way 64 as the cutter housing 60 operably adjusts for another cutting stroke.

Although a preferred embodiment of this invention has been disclosed, it should be understood the worker of ordinary skill in the art would recognize certain modifications which come within the scope of this invention. For that reason, the following claims should be studied in order to determine the true scope and contents of this invention.

I claim:

1. An adjustable cut off apparatus for cutting a segment from an elongated swept article comprising:
   a frame having a longitudinal axis;
   a carriage movably mounted on said frame for moving about a direction of the dimension of the said frame;
   a first arm pivotally mounted on said carriage;
   a first means for returning said first arm to an initial position;
   a second arm pivotally mounted on said first arm;
   a second means for returning said second arm to an initial position;
   a second arm stop means for limiting the rotation of said second arm, and for engaging said first arm with said second arm;
   a cutter housing operably and pivotally mounted on said second arm, said cutter housing having a first passageway, a second passageway aligned with said first passageway, a means for engaging said elongated swept article, and means for cutting for severing said elongated swept article;
   a third means for returning said cutter housing to an initial position; and
   a counterbalance means for supporting said carriage, said first arm, said second arm, and said cutter housing in a substantially "weight-free" state so that the weight of said carriage, said first arm, said second arm, and said cutter housing are free to pivot and translate as necessary to maintain engagement of said elongated swept article with said cutter housing during the cutting process.

2. An adjustable cut off apparatus as defined in claim 1 wherein said frame includes a fixed base, a support column fixedly mounted on said base, an overhead support fixedly mounted on said support column, and a brace fixedly mounted on said overhead support and said fixed base.

3. An adjustable cut off apparatus as defined in claim 1 wherein said first means for returning said first arm to an initial position is a first fluid cylinder.

4. An adjustable cut off apparatus as defined in claim 3 wherein said first fluid cylinder is mounted between said first arm and said frame.

5. An adjustable cut off apparatus as defined in claim 1 further including a first arm stop means to limit the rotation of said first arm with respect to said frame.

6. An adjustable cut off apparatus as defined in claim 1 wherein said means for returning said second arm to an initial position is a second fluid cylinder.

7. An adjustable cut off apparatus as defined in claim 6 wherein said second fluid cylinder is mounted between said second arm and said first arm.

8. An adjustable cut off apparatus as defined in claim 1 wherein said means for engaging said elongated swept article includes means for continuously rollingly engaging opposing sides of said elongated swept article.

9. An adjustable cut off apparatus as defined in claim 8 where in said means for continuously rollingly engaging opposing sides of said elongated article includes a set of upper and lower leading rollers and a set of upper and lower trailing rollers, said upper and lower leading rollers and said upper and lower trailing rollers defining a section of the elongated article through which said means for cutting will sever said elongated swept article.

10. An adjustable cut off apparatus as defined in claim 1 wherein said means for cutting includes a fluid press fixedly mounted on said cutter housing, a stationary die block fixedly mounted on said cutter housing, a movable die block mounted on said fluid press and juxtaposed to said stationary die block, said fluid press when energized for moving said movable die block through said elongated swept article during the cutting stroke.

11. An adjustable cut off apparatus as defined in claim 1 further including a means for measuring said elongated swept article, said means for measuring being operably connected to a means for controlling said fluid press.

12. An adjustable cut off apparatus as defined in claim 11 wherein said means for measuring includes an electronic optical measuring device.

13. An adjustable cut off apparatus as defined in claim 1, further including a cutter housing stop means to limit the position of said cutter means with respect to said frame.

14. An adjustable cut off apparatus as defined in claim 1, wherein said means for returning said cutter housing to an initial position is a third fluid cylinder mounted between said cutter housing and said frame.

15. An adjustable cut off apparatus as defined in claim 1, wherein said counterbalance means is readily adjustable so that said movable carriage, said first arm, said second arm, and said cutter housing can operably receive an elongated compound swept article.

16. An adjustable cut off apparatus as defined in claim 15 wherein said elongated swept article has at least one section with a sweep having a radius proportional to the length of said second arm, and said elongated article having at least one section with a sweep having a radius proportional to the sum length of said first arm and said second arm.

17. An adjustable cut off apparatus as defined in claim 15, wherein said counterbalance means is a fluid return cylinder.

18. An adjustable cut off apparatus as defined in claim 17, wherein said fluid return cylinder is fixedly mounted on a counterbalance support, and said counterbalance support is fixedly mounted on said frame.

19. An adjustable cut off apparatus for cutting a length from an elongated swept article comprising:
   a fixed base;
   a support column fixedly mounted on said base;
   an overhead support fixedly mounted on said support column;
   a brace fixedly mounted on said overhead support and to said base;
   a carriage movably mounted on said support column for ascending and descending said support column;
   a first arm pivotally mounted on said carriage;
   a first means for returning said first arm to an initial position;
   a second arm pivotally mounted on said first arm;
   a second means for returning said second arm to an initial position;
   a second arm stop means for limiting the rotation of said second arm, and for engaging said first arm with said second arm;

a cutter housing operably and pivotally mounted on said second arm, said cutter housing having a first passageway, a second passageway aligned with said first passageway, a means for engaging said elongated swept article, and means for cutting for severing said elongated swept article;

a means for returning said cutter housing to an initial position; and a counterbalance means for supporting said carriage, said first arm, said second arm, and said cutter housing in a substantially "weight-free" state so that the weight of said carriage, said first arm, said second arm, and said cutter housing are free to pivot and translate as necessary to maintain engagement of said elongated swept article with said cutter housing during the cutting process.

20. An adjustable cut off apparatus as defined in claim 19 wherein said first means for returning said first arm to an initial position is a first fluid cylinder.

21. An adjustable cut off apparatus as defined in claim 20 wherein said first fluid cylinder is mounted between said first arm and said overhead support.

22. An adjustable cut off apparatus as defined in claim 19 further including a first arm stop means to limit the rotation of said first arm with respect to said support column.

23. An adjustable cut off apparatus as defined in claim 19 wherein said means for returning said second arm to an initial position is a second fluid cylinder.

24. An adjustable cut off apparatus as defined in claim 23 wherein said second fluid cylinder is mounted between said second arm and said first arm.

25. An adjustable cut off apparatus as defined in claim 19 wherein said means for engaging said elongated swept article includes means for continuously rollingly engaging opposing sides of said elongated swept article.

26. An adjustable cut off apparatus as defined in claim 25 where in said means for continuously rollingly engaging opposing sides of said elongated article includes a set of upper and lower leading rollers and a set of upper and lower trailing rollers, said upper and lower leading rollers and said upper and lower trailing rollers defining a section of the elongated article through which said means for cutting will sever said elongated swept article.

27. An adjustable cut off apparatus as defined in claim 19 wherein said means for cutting includes a fluid press fixedly mounted on said cutter housing, a stationary die block fixedly mounted on said cutter housing, a movable die block mounted on said fluid press and juxtaposed to said stationary die block, said fluid press for shearingly moving said movable die block through said elongated swept article during the cutting stroke.

28. An adjustable cut off apparatus as defined in claim 19 further including a means for measuring said elongated swept article, said means for measuring being operably connected to a means for controlling said fluid press.

29. An adjustable cut off apparatus as defined in claim 28 wherein said means for measuring includes an electronic optical measuring device.

30. An adjustable cut off apparatus as defined in claim 19, further including a cutter housing stop means to limit the position of said cutter means with respect to said support arm.

31. An adjustable cut off apparatus as defined in claim 19, wherein said means for returning said cutter housing to an initial position is a third fluid cylinder mounted between said cutter housing and said base.

32. An adjustable cut off apparatus as defined in claim 19, wherein said counterbalance means is readily adjustable so that said movable carriage, said first arm, said second arm, and said cutter housing can operably receive an elongated compound swept article.

33. An adjustable cut off apparatus as defined in claim 32 wherein said elongated swept article has at least one section with a sweep having a radius proportional to the length of said second arm, and said elongated article having at least one section with a sweep having a radius proportional to the sum length of said first arm and said second arm.

34. An adjustable cut off apparatus as defined in claim 32, wherein said counterbalance means is a fluid return cylinder.

35. An adjustable cut off apparatus as defined in claim 34, wherein said fluid return cylinder is fixedly mounted on a counterbalance support, and said counterbalance support is fixedly mounted on said frame.

36. An adjustable cut off apparatus for cutting a length from an elongated article with different sweeps therein comprising:

a means for continuously supplying an elongated article with different sweeps therein;

a fixed base;

a pair of support columns fixedly mounted on said base;

an overhead support fixedly mounted on said support columns;

a pair of support braces fixedly mounted on said support columns;

a carriage movably mounted on said support columns for ascending and descending said support columns;

a first arm pivotally mounted on said carriage;

a first return means for returning said first arm to an initial position;

a second arm pivotally mounted on said first arm;

a second return means for returning said second arm to an initial position;

a second arm stop means for limiting the rotation of said second arm, and for engaging said first arm with said second arm;

a cutter housing operably and pivotally mounted on said second arm, said cutter housing having a first passageway, a second passageway aligned with said first passageway, a means for engaging said elongated swept article, and means for cutting for severing said elongated swept article;

a third return means for returning said cutter means to an initial position; and a counterbalance means for supporting said carriage, said first arm, said second arm, and said cutter housing in a substantially "weight-free" state so that the weight of said carriage, said first arm, said second arm, and said cutter housing are free to pivot and translate as necessary to maintain engagement of said elongated swept article with said cutter housing during the cutting process.

37. An adjustable cut off apparatus as defined in claim 36, wherein said means for continuously supplying an elongated article with different sweeps therein includes a roll mill and a sweep unit.

38. An adjustable cut off apparatus as defined in claim 36 wherein said first arm has an upper end and a lower forked end.

39. An adjustable cut off apparatus as defined in claim 36 wherein said first means for returning said first arm to an initial position is a first fluid cylinder.

40. An adjustable cut off apparatus as defined in claim 39 wherein said first fluid cylinder is mounted on an upper end of said first arm and to said overhead support.

41. An adjustable cut off apparatus as defined in claim 36 further including a first arm stop means to limit the rotation of said first arm with respect to said support column.

42. An adjustable cut off apparatus as defined in claim 38 wherein said second arm is pivotally mounted between tines of said lower forked end of said first arm.

43. An adjustable cut off apparatus as defined in claim 36 wherein said means for returning said second arm to an initial position is a second fluid cylinder.

44. An adjustable cut off apparatus as defined in claim 43 wherein said second fluid cylinder is mounted between said second arm and said first arm.

45. An adjustable cut off apparatus as defined in claim 36 wherein said means for engaging said elongated swept article includes means for continuously rollingly engaging opposing sides of said elongated swept article.

46. An adjustable cut off apparatus as defined in claim 45 where in said means for continuously rollingly engaging opposing sides of said elongated article includes a set of upper and lower leading rollers and a set of upper and lower trailing rollers, said upper and lower leading rollers and said upper and lower trailing rollers defining a section of the elongated article through which said means for cutting will sever said elongated swept article.

47. An adjustable cut off apparatus as defined in claim 36 wherein said means for cutting includes a fluid press fixedly mounted on said cutter housing, a stationary die block fixedly mounted on said cutter housing, a movable die block mounted on said fluid press and juxtaposed to said stationary die block, said fluid press for shearingly moving said movable die block through said elongated swept article during the cutting stroke.

48. An adjustable cut off apparatus as defined in claim 36 further including a means for measuring said elongated swept article, said means for measuring being operably connected to a means for controlling said fluid press.

49. An adjustable cut off apparatus as defined in claim 48 wherein said means for measuring includes an electronic optical measuring device.

50. An adjustable cut off apparatus as defined in claim 36, further including a cutter housing stop means to limit the position of said cutter means with respect to said support arm.

51. An adjustable cut off apparatus as defined in claim 36, wherein said means for returning said cutter housing to an initial position is a third fluid cylinder mounted between said cutter housing and said base.

52. An adjustable cut off apparatus as defined in claim 36, wherein said counterbalance means is readily adjustable so that said movable carriage, said first arm, said second arm, and said cutter housing can operably receive an elongated compound swept article.

53. An adjustable cut off apparatus as defined in claim 52 wherein said elongated swept article has at least one section with a sweep having a radius proportional to the length of said second arm, and said elongated article having at least one section with a sweep having a radius proportional to the sum length of said first arm and said second arm.

54. An adjustable cut off apparatus as defined in claim 52, wherein said counterbalance means is a fluid return cylinder.

55. An adjustable cut off apparatus as defined in claim 54, wherein said fluid return cylinder is fixedly mounted on a counterbalance support, and said counterbalance support is fixedly mounted on said frame.

* * * * *